US009460687B2

(12) United States Patent
Chiu et al.

(10) Patent No.: US 9,460,687 B2
(45) Date of Patent: Oct. 4, 2016

(54) CALIBRATION SYSTEM AND CALIBRATION METHOD FOR DISPLAY DEVICE

(71) Applicant: MStar Semiconductor, Inc., Hsinchu Hsien (TW)

(72) Inventors: Chih-Chiang Chiu, Zhubei (TW); Chi-Hsien Lo, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 149 days.

(21) Appl. No.: 14/313,137

(22) Filed: Jun. 24, 2014

(65) Prior Publication Data

US 2014/0375563 A1 Dec. 25, 2014

(30) Foreign Application Priority Data

Jun. 25, 2013 (TW) ............................ 102122583 A

(51) Int. Cl.
*G06F 3/033* (2013.01)
*G09G 5/08* (2006.01)

(52) U.S. Cl.
CPC ........ *G09G 5/08* (2013.01); *G09G 2320/0673* (2013.01); *G09G 2320/0693* (2013.01)

(58) Field of Classification Search
None
See application file for complete search history.

(56) References Cited

U.S. PATENT DOCUMENTS 8,089,455 B1 * 1/2012 Wieder .................... G09G 5/00 345/156
2007/0002079 A1 * 1/2007 Nash ...................... G09G 3/002 345/648
2008/0192017 A1 * 8/2008 Hildebrandt .......... G06F 3/0418 345/173
2012/0293400 A1 * 11/2012 Matsubayashi ...... G09G 3/3406 345/88

* cited by examiner

*Primary Examiner* — Adam R Giesy
(74) *Attorney, Agent, or Firm* — Edell, Shapiro & Finnan, LLC

(57) ABSTRACT

A calibration system for a display device is provided. The calibration system includes an image signal source, a user-motion sensing module, a control module, and a calibration interface. The image source drives the display device to display a reference image and an indication icon included in the reference image. The user-motion sensing module detects a user motion and generating a corresponding sensing result. The control module controls the image signal source to move the indication icon according to the sensing result. After selecting a region to be calibrated in the reference image by the indication icon through the user-motion sensing module, a user can adjust an image characteristic parameter of the display device that corresponds to the region to be calibrated through the calibration interface.

11 Claims, 3 Drawing Sheets

CALIBRATION SYSTEM AND CALIBRATION METHOD FOR DISPLAY DEVICE

This application claims the benefit of Taiwan application Serial No. 102122583, filed Jun. 25, 2013, the subject matter of which is incorporated herein by reference.

BACKGROUND OF THE INVENTION

1. Field of the Invention

The invention relates in general to a calibration technology, and more particularly to a calibration technology for a display device.

2. Description of the Related Art

Ensuring normal functionality of products when the products are shipped out of the factory is always a focus of manufacturers. By pre-filtering out and repairing problematic products, post-sales returns and exchanges can be effectively prevented to increase customer satisfaction.

For a display device, a common test item is inputting data of a reference image at a signal receiving end of the display device, and an actual display result is monitored to ensure its correctness. For example, referring to FIG. 1, the reference image may include multiple vertical gray lines having different brightness levels (gradually increasing from left to right). Assuming that a grayscale range that the display device provides is 0 to 255, the reference image may include gray lines having a maximum of 256 different brightness levels. Known to one person skilled in the art, grayscale values of the three primary colors—red, green and blue, in gray pixels, are equal. When a reference image is displayed by a screen under test, as a reflection on unsatisfactory color linearity of the screen under test, an image presented by the screen under test may include non-gray pixels. Once the above problem is identified, settings (e.g., a gamma curve) are usually manually adjusted by testing personnel to correct lines with abnormal colors to expected gray lines.

In the prior art, testing personnel mostly determine rough positions of the abnormal lines by the naked eye, and gradually approximate actual positions of the abnormal lines starting from the rough positions. Having locked precise positions of the abnormal lines, the testing personnel then start adjusting image characteristic parameters of the abnormal lines. Assume that an abnormal line appears at a position 20A in FIG. 2. The position 20A falls in a central region and slightly to the right in the overall reference image, and thus the testing personnel may preliminarily determine that the grayscale that needs to be adjusted in the gamma curve is close to but slightly higher than the grayscale value 128. In one approach for identifying the exactly grayscale value corresponding to the position 20A, a signal source is controlled to intentionally set a vertical line corresponding to the grayscale value 128 in the reference frame to a distinct color that can be easily identified (e.g., pure red in a high brightness level), and to further mark a position of the line corresponding the grayscale value 128. Next, the testing personnel may gradually change the position of the reference line having the intentionally changed color, e.g., sequentially changing the color of the vertical lines corresponding to grayscale values 129, 130, 131 . . . , until the reference line overlaps with the abnormal line. With the confirmed grayscale value corresponding to the abnormal line, the testing personnel can then adjust the image characteristic parameters corresponding to the grayscale value in the gamma curve.

The above calibration solution may be extremely time-consuming. For multiple abnormalities occurring in a same screen under test, the calibration procedure for the screen under test may take up an entire day, and is thus quite uneconomical.

SUMMARY OF THE INVENTION

The invention is directed to a calibration system and a calibration method. Through a user-motion sensing module, testing personnel are allowed to directly and distinctly select pixels or an image region to be calibrated and to obtain associated image characteristic parameters. Compared to a conventional solution that searches for an abnormal region by trial and error, the calibration system and the calibration method of the present invention offers higher efficiency as well as more convenient operations.

According to an embodiment of the present invention, a calibration system for a display device is provided. The calibration system includes an image signal source, a user-motion sensing module, a control module and a calibration interface. The image signal source drives the display device to display a reference image and an indication icon included in the reference image. The user-motion sensing module detects a user motion and generates a corresponding sensing result. The control module controls the image signal source to move the indication icon according to the sensing result. After selecting a region to be calibrated in the reference image by the indication icon through the user-motion sensing module, a user is allowed to adjust an image characteristic parameter of the display device that corresponds to the region to be calibrated through the calibration interface.

According to another embodiment of the present invention, a calibration method for a display device is provided. The method includes: providing an image signal that drives the display device to display a reference image and an indication icon included in the reference image; detecting a user motion and generating a corresponding sensing result; controlling the image signal source to move the indication icon according to the sensing result; and providing a calibration interface, through which allows a user to adjust an image characteristic parameter of the display device corresponding to a region to be calibrated after the user selects that region in the reference image by the indication icon.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3A:
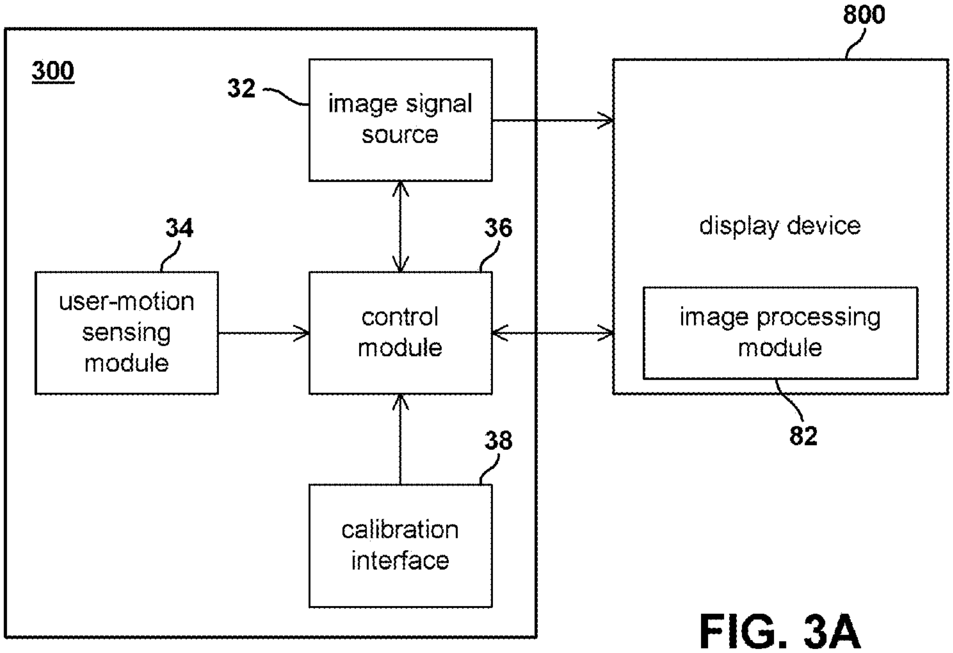
FIG. 3(A) and FIG. 3(B) are function block diagrams of a calibration system according to embodiments of the present invention.

FIG. 3(A) shows a function block diagram of a calibration system for a display device according to an embodiment of the present invention. It should be noted that, the term "present invention" refers to invention concepts presented by non-limiting embodiments below. A calibration system 300 includes an image signal source 32, a user-motion sensing module 34, a control module 36, and a calibration interface 38. As shown in FIG. 3(A), in a test mode, the image signal source 32 and the control module 36 are both coupled to a display device 800.

In practice, for example, functions of elements including the image signal source 32, the user-motion sensing module 34, the control module 36 and the calibration interface 38 may be realized by a personal computer system. For example, the image signal source 32 may be a display card in the personal computer system, and connects to the display device 800 via an image transmission line compliant with specifications such as digital visual interface (DVI) or high-definition multimedia interface (HDMI). The user-motion sensing module 34 may be a mouse or a touch pad that coordinates with the personal computer system. Functions provided by the control module 36 may be predetermined as processor commands, which are stored in a non-transient computer-readable medium and are executable by a processor of the personal computer system. Alternatively, functions provided by the control module 36 may be integrated in a dedicated circuit chip. The calibration interface 38 may be a keyboard or another input device that coordinates with the personal computer system.

Figure 1:
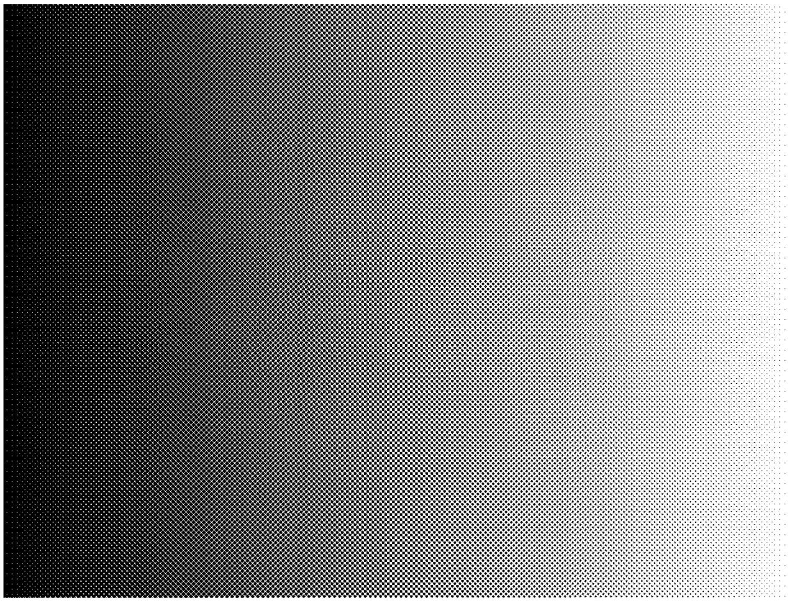
FIG. 1(prior art)
FIG. 1 is an example of a reference image of a display device under test.
Figure 2:
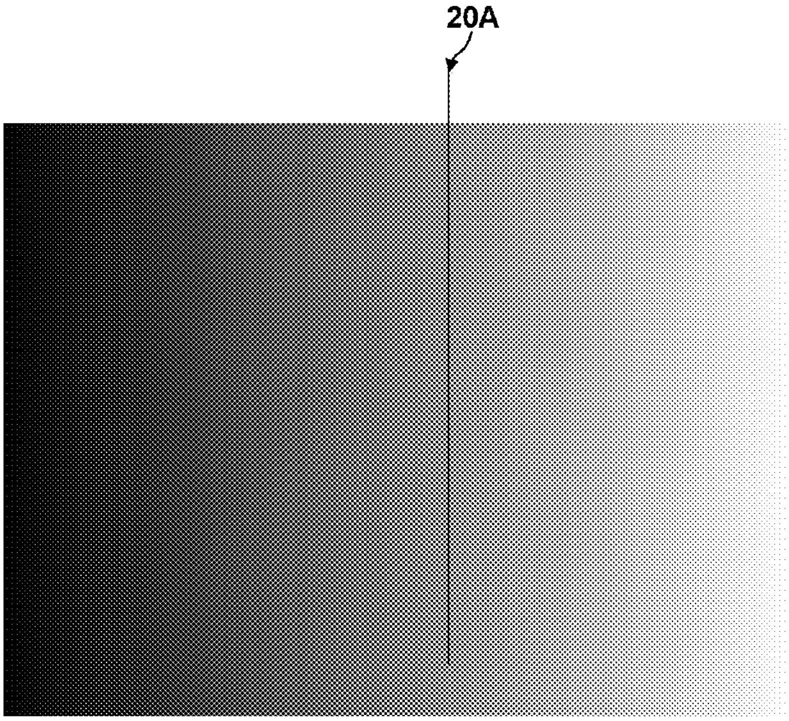
FIG. 2(prior art)
FIG. 2 is an example of a display result with an abnormal line.

The image signal source 32 drives the display device 800 to display a reference image and an indication icon (e.g., a cursor) included in the reference image. The reference image may be determined by testing personnel based on actual testing requirements. If color linearity of the display device 800 is being tested, the reference image may be the example shown in FIG. 1. If other display characteristics such as the brightness level and contrast are being tested, the corresponding reference images may be different.

The user-motion sensing module 34 detects a user motion and generates a corresponding sensing result. The control module 36, coupled to the user-motion sensing module 34 and the image signal source 32, controls the image signal source 32 to move the cursor according to the sensing result of the user-motion sensing module 34. Taking a situation where the user-motion sensing module 34 is a mouse for example, when a user smoothly moves the mouse, the cursor in the reference image displayed by the display device 800 also correspondingly moves. One person skilled in the art can understand that, instead of being a mouse, the user-motion sensing module 34 may be implemented in various forms, e.g., a touch pad, drawing pad or trackball having similar functions.

In practice, a coordinate position of the cursor relative to the entire reference image is known to the control module 36. Accordingly, the control module 36 retrieves one or multiple image characteristic parameters corresponding to a current position of the cursor from an image processing module 82 of the display device 800. For example, the control module 36 may first determine to which pixel (to be referred to as a target pixel) in the reference image that the cursor currently points, and then identify grayscale values of red, green and blue colors of the target pixel that the image signal source 32 provides to the display device 800. According to the grayscale values, the control module 36 may identify a gamma curve parameter of the target pixel from a gamma look-up table in the image processing module 82.

In one embodiment, the control module 36 controls the image signal source 32 to display the image characteristic parameters corresponding to the current position of the cursor on the display device 800 in form of an on-screen display (OSD). Thus, by moving the cursor on the image through the user-motion sensing module 34, the user may learn the image characteristic parameters of the pixels. In one embodiment, the user may select a range including multiple pixels as a region to be calibrated by clicking or cropping using the cursor through the user-motion sensing module 34. After the region is selected, the control module 36 controls the signal image source 32 to display the image characteristic parameters corresponding to the region to be calibrated by an OSD. In other words, before the user selects a region, the OSD does not appear in the reference image. In another embodiment, instead of having the user select the region to be calibrated, the pixel pointed by the current position of the cursor is regarded as the target region, and the control module 36 controls the signal image source 32 to display the image characteristic parameters corresponding to the current position of the cursor on the display device 800 in real-time.

After selecting the region by the cursor through the user-motion sensing module 34, the user may adjust the image characteristic parameters corresponding to the region to be calibrated through the calibration interface 48. For example, the calibration interface 38 may be an input device. Taking the calibration interface 38 as a keyboard for example, in the test mode, certain keys in the keyboard may be set to change the gamma curve parameters stored in the gamma look-up table in the image processing module 82. Alternatively, the user may directly input the calibrated gamma curve parameters via the number keys on the keyboard. According to the modified image that the display device 800 subsequently displays, the user may learn whether the image characteristic parameter needs to be again adjusted.

It should be noted that, displaying the image characteristic parameters corresponding to the region to be calibrated on the display device 800 is optional. Further, when the selected region includes multiple pixels, the user may further select and adjust a part of multiple image characteristic parameters corresponding to the pixels.

It is seen from the above description that, different from the conventional solution that identifies an abnormal region by trial and error, according to the embodiment of the present invention, the testing personnel are allowed to precisely select the pixel or image region to be calibrated from the reference image through the user-motion sensing module 34, thereby saving large amounts of time and efforts for positioning the abnormal region. Further, the above operation method is highly intuitive and thus offers a great convenience to the testing personnel.

Figure 3B:
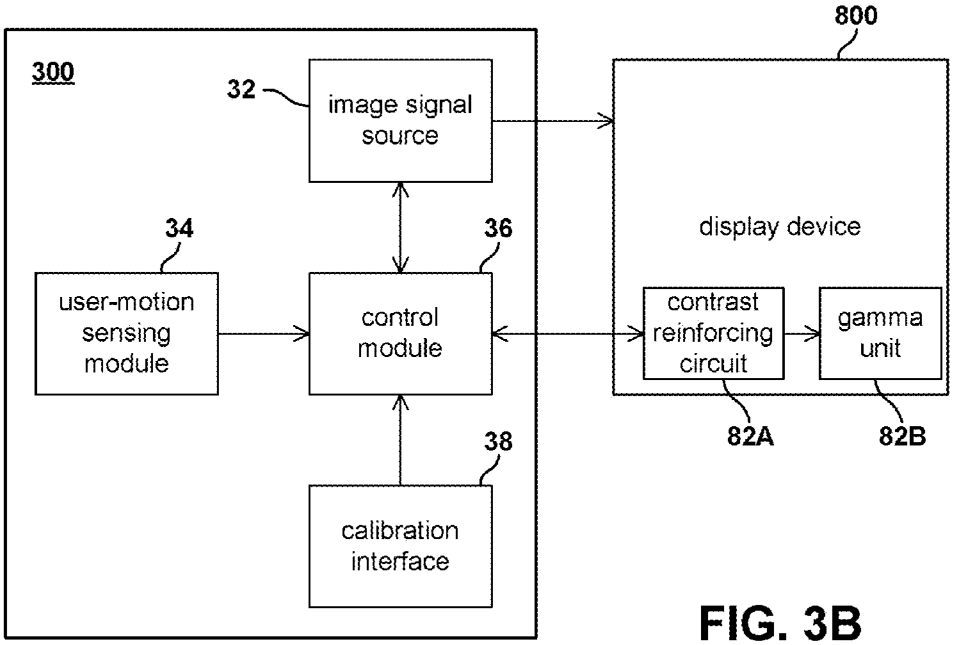

As shown in FIG. 3(B), in addition to a gamma unit 82B, the image processing module 82 in the display device 800 may further include a circuit for performing other image processing procedures, e.g., a contrast reinforcing circuit 82A. In the example, before enter the gamma unit 82B, data of the reference image provided by the image signal source 32 first undergoes a process of the contrast reinforcing circuit 82A. As such, the grayscale value that the image signal source 32 provides for a target pixel may not necessarily be the same as the grayscale value of the target pixel fed into the gamma unit 82B. Under such circumstances, given the display device 800 provides a hardware cursor function, the control module 36 may fill the coordinate position of the target pixel to which the cursor points to an address buffer assigned by the hardware cursor, and fetch image information associated with the image characteristic parameter from a corresponding data buffer. Later, the control module 36 may retrieve the image characteristic parameter from the gamma unit 82B according to the image information.

When the calibration system 300 is not a personal computer system that coordinates with a device such as a mouse, a trackball or a touch pad, the user-motion sensing module 34 may be designed as an OSD indication controller, e.g., a keyboard. Provided with an appropriately designed collaborating operation program, the testing personnel may similarly select the region to be calibrated through the OSD indication.

Figure 4:
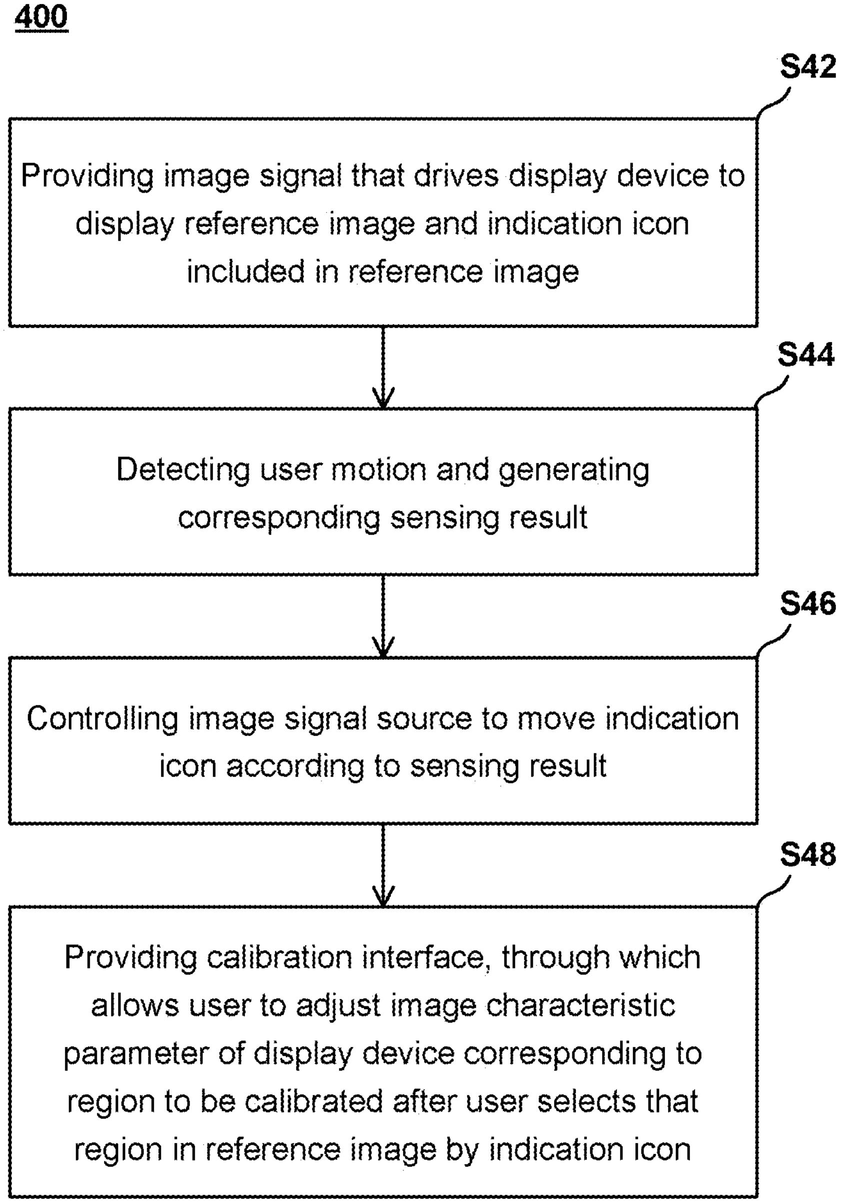
FIG. 4 is a flowchart of a calibration method according to an embodiment of the present invention.

According to another embodiment of the present invention, a calibration method for a display device is provided. FIG. 4 shows a flowchart of a process 400 of the calibration method. In step S42, an image signal is provided to drive the display device to display a reference image and an indication icon included in the reference image. In step S44, a user motion is detected and a corresponding sensing result is generated. In step S46, the image signal source is controlled to move the indication icon according to the sensing result. In step S48, a calibration interface is provided, through which allows a user to adjust an image characteristic parameter of the display device corresponding to a region to be calibrated after the user selects that region in the reference image by the indication icon.

Operation details and variations (e.g., the method for obtaining the image characteristic parameters of the region to be calibrated) in the description associated with the calibration system 300 are applicable to the process 400 of the calibration method, and shall be omitted herein.

In practice, the calibration system 300 may further integrate other testing functions, or may be an independent unit. As previously described, through the user-motion sensing module, the testing personnel are allowed to directly and distinctly select the pixel or image region to be calibrated and to obtain associated image characteristic parameters. Compared to the conventional solution that identifies an abnormal region by trial and error, the calibration system and the calibration method of the present invention are more efficient.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A calibration system for a display device, comprising:

an image signal source, coupled to the display device, configured to drive the display device to display a reference image and an indication icon in the reference image;

a user-motion sensing module, configured to detect a user motion and to generate a corresponding sensing result;

a control module, coupled to the user-motion sensing module and the image signal source, configured to control the image signal source to move the indication icon according to the sensing result; and a calibration interface, which allows a user to adjust an image characteristic parameter of the display device corresponding to a region after the user selects the region in the reference image by the indication icon, wherein the indication icon comprises a cursor; the control module fills coordinate information of the cursor into a hardware cursor address buffer of the display device, fetches image information associated with the image characteristic parameter from a corresponding data buffer, and retrieves the image characteristic parameter according to the image information.

2. The calibration system according to claim 1, wherein the user-motion sensing module is a mouse, a touch pad or an on-screen display (OSD) indication controller.

3. The calibration system according to claim 1, wherein the user selects the region by clicking or by cropping through the user-motion sensing module.

4. The calibration system according to claim 1, wherein the region comprises one or a plurality of pixels.

5. The calibration system according to claim 1, wherein the image characteristic parameter is a gamma curve parameter.

6. The calibration system according to claim 1, wherein the control module controls the image signal source to display the image characteristic parameter in form of an OSD on the display device.

7. The calibration system according to claim 1, wherein the calibration interface comprises an input device.

8. A calibration method for a display device comprising:

a) providing an image signal that drives the display device to display a reference image and an indication icon in the reference image;

b) detecting a user motion and generating a corresponding sensing result;

c) controlling to move the indication icon according to the sensing result; and d) providing a calibration interface, which allows a user to adjust an image characteristic parameter of the display device corresponding to a region after the user selects the region in the reference image by the indication icon, the method further comprising:

filling coordinate information of the cursor into a hardware cursor address buffer of the display device;

fetching image information associated with the image characteristic parameter from a corresponding data buffer; and retrieving the image characteristic parameter according to the image information.

9. The calibration method according to claim 8, wherein the region comprises one or a plurality of pixels.

10. The calibration method according to claim 8, wherein the image characteristic parameter is a gamma curve parameter.

11. The calibration method according to claim 8, further comprising:

controlling the image signal to display the image characteristic parameter in form of an OSD on the display device.

* * * * *